(12) United States Patent
Zebec et al.

(10) Patent No.: US 9,097,116 B2
(45) Date of Patent: Aug. 4, 2015

(54) APPARATUS AND METHOD FOR THE FORMING OF TURBINE VANE COVER PLATES

(71) Applicant: ALSTOM Technology Ltd, Baden (CH)

(72) Inventors: Igor Zebec, Neuenhof (CH); Raphael Schweizer, Lengnau (CH); Josip Stedul, Untersiggenthal (CH); Tobias Schmitt, Olten (CH); Frigyes Szücs, Langenbruck (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 198 days.

(21) Appl. No.: 13/691,776

(22) Filed: Dec. 1, 2012

(65) Prior Publication Data

US 2013/0142639 A1    Jun. 6, 2013

(30) Foreign Application Priority Data

Dec. 6, 2011 (EP) .................................... 11192222

(51) Int. Cl.
*B21D 3/16* (2006.01)
*B23P 6/00* (2006.01)
(Continued)

(52) U.S. Cl.
CPC .. *F01D 9/02* (2013.01); *B21D 3/16* (2013.01); *B23P 6/002* (2013.01); *B23P 15/04* (2013.01);
(Continued)

(58) Field of Classification Search
CPC ............ B21D 3/16; B21K 3/04; B23P 6/002; B23P 15/04; B30B 9/28; F01D 5/005; F05D 2230/80; Y10T 29/49318; Y10T 29/49748
See application file for complete search history.

(56) References Cited

U.S. PATENT DOCUMENTS 3,333,447 A    8/1967    Alspaugh
3,621,700 A    11/1971   Wachtell et al.
(Continued)

FOREIGN PATENT DOCUMENTS

CH    701031 A1    11/2010
DE    2100752 A1   9/1971
(Continued)

OTHER PUBLICATIONS

Office Action issued on Dec. 15, 2014, by the European Patent Office in corresponding European Patent Application No. 12194661.0. (7 pages).

*Primary Examiner* — Alexander P Taousakis
*Assistant Examiner* — Matthew P Travers
(74) *Attorney, Agent, or Firm* — Buchanan Ingersoll & Rooney PC (57) ABSTRACT

A method is provided for reconditioning a turbomachine vane cover plate, by a forming apparatus. The vane having a mounting portion, an airfoil extending radially outward therefrom and a vane head connected to the airfoil. The vane also having a cover plate connected to the vane head, bulged in a direction opposite to the root. In a first analysis step, dimensions of the vane in relation to the cover plate are determined in respect of predefined reference points. If, thereafter, forming of the cover plate seems necessary and possible based on comparison of measurement values from the analysis step with predefined dimension values, the bulged cover plate is formed, at least essentially pressed smooth, by pressing by the forming apparatus in a forming step. After the forming step, the cover plate is re-treated in one or more follow-up steps. An apparatus is also provided for carrying out the method.

13 Claims, 3 Drawing Sheets

(51) Int. Cl.
  *F01D 5/00* (2006.01)
  *F01D 9/02* (2006.01)
  *B23P 15/04* (2006.01)

(52) U.S. Cl.
  CPC ............ *F01D 5/005* (2013.01); *Y10T 29/4932* (2015.01); *Y10T 29/49318* (2015.01); *Y10T 29/49748* (2015.01)

(56) References Cited

U.S. PATENT DOCUMENTS

| | | | |
|---|---|---|---|
| 4,188,811 A * | 2/1980 | Brimm | 72/63 |
| 4,431,172 A | 2/1984 | Soda et al. | |
| 5,577,378 A | 11/1996 | Althaus et al. | |
| 5,813,835 A | 9/1998 | Corsmeier et al. | |
| 6,049,978 A * | 4/2000 | Arnold | 29/889.1 |
| 6,938,447 B2 * | 9/2005 | Fuse et al. | 72/21.5 |
| 8,651,802 B2 | 2/2014 | Bergman et al. | |
| 2005/0120555 A1 | 6/2005 | Boudereau et al. | |
| 2011/0229305 A1 | 9/2011 | Bergman et al. | |

FOREIGN PATENT DOCUMENTS

| | | |
|---|---|---|
| EP | 0620362 B1 | 10/1994 |
| EP | 2 366 873 A2 | 9/2011 |
| GB | 2390048 A | 12/2003 |
| WO | 200017490 A2 | 3/2000 |

\* cited by examiner

APPARATUS AND METHOD FOR THE FORMING OF TURBINE VANE COVER PLATES

INCORPORATION BY REFERENCE

The following documents are incorporated herein by reference as if fully set forth: European Patent Application No. 11192222.5, filed Dec. 6, 2011.

FIELD OF INVENTION

The present invention is in the field of turbine technology, in particular of gas turbines, and relates to a method and an apparatus for the forming of a cover plate or a shroud of a turbine vane.

BACKGROUND

Turbine components of turbomachines, for example vanes of gas turbines (reference may be made in this regard, for example, to EP 0 620 362 B1), are exposed, by virtue of their design and function, to considerable thermal and mechanical stresses, on account of which damage, inter alia undesirable material deformations, may occur during the intended use of the machine. This applies particularly to turbine vanes. Such deformations of elements, in particular of elements moving in relation to an adjacent element, which arise as a result of thermal and mechanical load, may lead to adverse frictional and/or sealing losses. This may be detrimental to the efficiency of the machine and, for example, make it necessary to an increased extent, because of the stripping of material, to carry out an inspection of the turbo machine, focusing on specific wearing parts.

In simplified terms, a (gas) turbine has along an axis a compression portion with a compressor for a working fluid (for example, for gas, such as air), and, following downstream, at least one combustion chamber in which pressurized hot fluid, for example a hot gas, is generated by the admixing and ignition of fuel, and then, following the combustion chamber, a turbine portion, by means of which mechanical performance is generated, along with a partial expansion of the abovementioned hot fluid.

A plurality of rows or rings of (rotating) moving blades and (stationary) guide vanes are provided in the turbine in the direction of flow, for example in an alternating arrangement. For routing the flow of the working fluid and to achieve high efficiency in the transmission of pulses from the working fluid to the moving blades, the turbine unit usually comprises a number of stationary guide vanes. These are fastened in the form of a ring to an inner casing or to the stator of the turbine. Moving blades serve for driving the turbine shaft by the transmission of pulses from the working fluid flowing through the turbine.

These vanes are therefore either fastened, for example, to a rotor at a base plate, called a vane root, and extend radially outward with a vane body or airfoil or, for example fastened with the vane root to a stator, project radially outward with the vane body with respect to the axis.

The vane root of the guide vane can therefore be arranged on the inner casing of the turbine as a wall element in order to fix the respective guide vane and can form the outer boundary of a flow duct for the working fluid flowing through the turbine. At a distal end of the vane body, lying opposite the vane root, cover plates or shrouds can be connected for sealing purposes, as is known from the prior art. The flow duct can be delimited inwardly, and therefore clearly defined, by a ring shaped seat like shroud formed by cover plates lined up with one another. Moreover, a medium cooler than the abovementioned working fluid can flow around the flow duct, for example in order to limit a temperature of the corresponding turbine components.

In order to achieve as high a turbine inlet temperature of the working fluid or working medium as possible and therefore high efficiency, special materials and cooling techniques are employed for the vanes of the turbine. For example, in modern gas turbines, cooling ducts through which cooling medium flows are drawn through the guide vanes and moving blades of the turbine which are thus cooled. For this purpose, cooling medium is routed in a predefined way through cooling ducts and cooling cavities in the turbine vane (that is to say, through the guide vane and/or moving blade) and/or is conducted outward at various locations on the vane through corresponding orifices (bores, slots). A cooled vane of this type is described in U.S. Pat. No. 5,813,835, which is herein incorporated by reference. The turbine vanes, together with the cover plates, are consequently exposed to the high temperatures and temperature gradients under operating conditions, thus leading to their use induced wear.

A treatment of seals, necessary on account of the abovementioned cooling technology, of a turbine vane worn in this respect as a result of use is known, for example, from CH 701 031 A1. This publication teaches how seals damaged in this way can be exchanged.

However, during operation, damage to other parts of the turbine vane can also occur. On account of the thermal and mechanical load, the head of the guide vane and/or moving blade of a turbine may be deformed. In particular, those regions of the cover plates which span a cavity may bulge outward, that is to say opposite to the direction from the respective cover plate to the vane root. Such bulging and therefore the loss of the original shape may lead to increased or undesirable rubbing contact between the cover plate or a covering layer covering the cover plate and the opposite surface moving in relation to this and to corresponding wear making refurbishment necessary.

In an inspection of the vane, the vane has to be reworked in such a way that, when reinstalled, it satisfies the stringent requirements as to stability conditions and to fitting accuracy.

SUMMARY

The present disclosure is directed to a method for reconditioning a cover plate of a vane of a turbomachine, by means of a forming apparatus, the vane including a mounting portion with fastening elements being connected, from a vane root of the vane, radially outward with respect to a rotor axis of the turbomachine, and an airfoil being connected in the opposite direction. A vane head is connected to the airfoil and a cover plate is connected to the vane head. The cover plate being bulged in a direction opposite to the vane root. The method includes determining, in an analysis step, dimensions of the vane in relation to the cover plate with respect to predefined reference points of the vane by means of dimension analysis. If after the analysis step, forming of the cover plate is determined to be necessary and possible based on a comparison of measurement values from the analysis step with reference values, then the bulged cover plate is formed at least essentially pressed smooth, by pressing by means of the forming apparatus in a forming step. If appropriate, after the forming step, the cover plate is retreated in one or more follow up steps.

The present disclosure is also directed to an apparatus for the forming the above-mentioned cover plate. The apparatus includes a carrier frame with side elements arranged so as to be spaced apart and with a base element and a connection element which extend in each case between the side elements. The apparatus also includes a pressure plate movable by a press cylinder attached to the connection element and a pressure cell, delimited by a base plate, for the vane, which is fixable in the pressure cell by fastening elements between stop elements extending laterally with respect to the vane from the base plate to the pressure plate toward free ends and laterally delimiting the pressure cell. The pressure cell is closable by the pressure plate being pressed by the press cylinder onto the vane and against the stop elements configured so as to stop the pressure plate The present disclosure is further directed to a turbine vane having a cover plate formed by the above-mentioned method and/or the above-mentioned apparatus.

Moreover, the present disclosure is directed to a use of the above-mentioned method and apparatus to form the cover plate.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Introduction to the Embodiments

An object of the invention, therefore, is to specify an improved method and an improved apparatus for the forming, reconditioning or refurbishment of a cover plate of a turbine vane, in particular of a turbine guide vane.

This and further objects are achieved, according to the invention, by means of a method for the reconditioning, forming or refurbishment of a cover plate of a vane of a turbomachine, in particular a guide vane of, for example, a gas turbine, by means of a forming apparatus, with a mounting portion with fastening elements being connected, from a vane root of the vane, to one side, for example radially outward with respect to a rotor axis of the turbomachine, and an airfoil being connected in the opposite direction, a vane head being connected to the airfoil and the cover plate being connected to the vane head, the cover plate being bulged in the direction opposite to the vane root, in that, in a first step, an analysis step, dimensions of the vane with regard to the cover plate are determined in respect of predefined reference points of the vane by means of dimension analysis, and in that, if, after the analysis step, forming of the cover plate seems necessary and possible on account of a comparison of measurement values from the analysis step with reference values, the bulged cover plate is formed by means of the forming apparatus in a forming step by pressing, in particular is at least essentially pressed smooth. Optionally, after the forming step, the cover plate may be re-treated in one or more follow up steps.

The bulging of the cover plate mostly relates at least to a middle region of the planar cover plate, in particular a region of the cover plate under which is located a cavity, provided, for example, for a coolant circulating in it. The terms "cover plate" and "shroud" are used here synonymously.

Reference points are locations on the vane which are not affected or are affected only minimally by deformation and/or wear as a result of the intended use of the vane. These may be, in particular, places in the mounting portion, that is to say, for example, on the fastening elements, the vane root or at marginal regions of the cover plate itself. The reference points serve for establishing by means of distance measurement whether the cover plate is bulged and whether it is bulged sufficiently for forming according to the invention to be necessary and implementable. Such a dimension analysis is carried out in the analysis step. Measurement values collected in the analysis step are then compared with reference values dependent on the turbine vane type and, if the bulge is greater than a minimum value, the vane qualifies for forming and the forming step can be carried out.

Follow up steps are, for example, steps in which the cover plate is ground, cleaned and/or provided with one or more covering layers.

The method according to the invention may comprise a grinding step which is to be carried out after the forming step and which involves at least the smooth grinding of an outer surface of the cover plate with respect to the vane, preferably by CNC grinding, with no or only minimal stripping of basic material from the cover plate, the analysis step preferably being carried out once again after the forming step and before or after the grinding step, in order to determine the effect of the forming step and, where appropriate, of the grinding step. Avoiding the stripping of material from the cover plate is of central importance, since the cover plates are coordinated optimally with their materially demanding use, and the stripping of material leads to an undesirable or even dangerous structural weakening of the vane and therefore of the turbine.

In the simplest instance, a bulged cover plate or its covering layer may be ground down directly in such a way that the originally desired shape of the vane head is essentially restored, that is to say, for example, is ground flat. This procedure presents problems, however, since the stripping of material from the cover plate leads to thinning of the cover plate, with the result that predefined stability and safety conditions may be infringed. The method according to the invention is advantageous in this regard, since, by virtue of the forming step, it diminishes or even avoids thinning of the cover plate. A cover plate can consequently be refurbished more often and/or more effectively; a service life of the vane can thus be prolonged, which, for example, saves costs.

The grinding step may comprise the grinding of a concavity into the cover plate, the concavity preferably being correspondingly adapted to an element, for example the rotor, which is arranged opposite the cover plate mounted in the operationally ready turbomachine and which moves in relation to the cover plate, in such a way that the concavity partially receives this element. In other words, the rotor or the respective element can project into the concavity, with the result that space and sealing conditions are optimized.

Basically, the concavity is a recess which, on account of the circular movements generically occurring in turbomachines, is advantageously part of a circular cylinder with a cross sectional configuration in the form of a segment of a circle. However, the concavity may also have another shape which conforms to the corresponding structural conditions of the turbomachine and which is to be determined by a person skilled in the art.

For forming the cover plate during the forming step, a press block contacting the cover plate with a pressure surface may be used, the press block preferably being composed of softer material than the cover plate, in particular of aluminum, this press block preferably having on its pressure surface an outwardly directed bulge, by means of which an indentation is pressed into the cover plate, preferably into a central region of the cover plate.

Before the forming step, a covering layer, for example a honeycomb layer, which may be present on the surface of the cover plate and may be worn can be essentially removed in a rough stripping step. In this case, care must be taken to ensure that no material of the cover plate is stripped off.

A worn covering layer should be largely removed at least to an extent such that the forming step can be carried out, as intended, and cannot be disturbed by covering layer material. Pressing of the cover plate should therefore be possible which approaches an intended or desired shape of the cover plate. If therefore, for example, a concavity in the cover plate is intended, the pressing of an indentation is advantageous, since less basic material of the cover plate has to then be stripped off in a grinding step. If, then, a partially damaged covering layer is present on the shroud, pressing with a press block corresponding to the intended shape of the cover plate can lead to undesirable deformations of the cover plate. For this reason, a covering layer which causes such disturbance should be at least roughly stripped off, so that only remains of the covering layer which are detrimental to forming only minimally or preferably not at all are left behind.

It is advantageous if such remains are eliminated only after any grinding step, since a grinding step sometimes already eliminates these in the grinding region. After the grinding step, therefore, any remains of any covering layer can be removed from the cover plate in a fine stripping step, preferably by grinding off the remains from the surface by hand. Here, too, care must be taken to ensure that no or only minimal stripping of material from the cover plate takes place.

Advantageously, after the grinding step and, if appropriate, after the fine stripping step, at least one welding recess running essentially laterally along and parallel to the cover plate may be introduced in a lateral region of contact between the cover plate and the vane head in a welding preparation step, the welding recess cutting out parts of the cover plate and parts of the vane head.

In a welding step, the cover plate and the vane head are welded together in the welding recesses so as to fill the welding recesses with welding material from the inside outward. The weld seam is consequently to a large extent protected optimally in the welding recess or welding groove.

Such welding of the cover plate and vane head together ensures the connection between the cover plate and the vane head, so that any structurally weak places in the connection between the cover plate and vane head which have occurred as a result of the forming or refurbishment or reconditioning of the cover plate do not lead to subsequent problems when the turbomachine is in operation.

The method according to the invention may comprise a mounting step in which a new covering layer, in particular a metallic honeycomb layer with honeycombs extending away from the cover plate, is applied to the cover plate, preferably by being soldered on, an outer surface of this covering layer running essentially parallel to the surface of the cover plate. This covering layer should therefore, where appropriate, have in dimensional terms essentially the same concavity or recess as the cover plate. It is conceivable that the covering layer varies in its strength, that is to say its thickness, over the cover plate. The cover plate can thus be brought by forming and any grinding into a shape which takes into account a shape of the covering layer in such a way that a recess which assumes the abovementioned function is obtained in the covering layer only by the covering layer being applied to the cover plate.

The method according to the invention can comprise a further step in which the forming apparatus is calibrated. This calibration step is geared to a specimen part. The specimen part is a mold which provides or simulates parts, relevant to the method, of the turbine vane which is shaped, as desired, that is to say not deformed. In the calibration step, the specimen part, which simulates relevant portions of an optimally shaped vane with a non bulged cover plate, that is to say with a specimen surface shaped as desired, and corresponding to the surface of the cover plate, is inserted into the forming apparatus, a press cylinder which the forming apparatus comprises then being moved toward this specimen surface, until the press block mounted on the press cylinder directly touches the specimen surface in a target position, without the specimen surface being deformed or damaged, and thereafter, before the calibration step, stop elements not directly contacting the press block in the target position being guided, by means of setting elements of the forming apparatus which are attached to the stop elements, into contact against abutment elements connected firmly to the press block, without the press block being moved, and the setting elements then being fixed, as intended, such that, when the press cylinder is extended once again, after its retraction, the stop elements, via the setting elements, make the press block extendable via the abutment elements in a defined manner only as far as the abovementioned target position.

Care must therefore be taken to ensure that, before the calibration step, the setting elements of the stop elements are retracted, that is to say the instantaneous abutment height of the stop elements is lower than that required. For this purpose, for example, the stop elements may have, on the end face directed toward the press block, a recess with a thread, into which recess a bolt with a corresponding thread and with an end face bearing element can be screwed vertically adjustably for abutment. Further such solutions are known to a person skilled in the art.

The apparatus according to the invention is used in the forming of a cover plate of a turbine vane. According the forming apparatus, for carrying out or using a method according to the invention, in a carrier frame with side elements arranged so as to be spaced apart and with a base element and a connection element which respectively extend between the side elements, a pressure plate movable by a press cylinder attached to the connection element and a pressure cell, delimited by a base plate, for the vane are provided, the vane being fixable in the pressure cell by means of fastening elements between stop elements extending laterally with respect to the vane from the base plate to the pressure plate toward free ends and laterally delimiting the pressure cell, and the pressure cell being closable by the pressure plates being pressed by means of the press cylinder onto the vane and against the stop elements configured so as to stop the pressure plate.

In this case, the pressing direction, that is to say the lifting direction of the cylinder, is preferably vertical. However, it is clear to a person skilled in the art that the apparatus may also be constructed in such a way that the pressing direction is any direction, in particular a horizontal direction.

Preferably, the apparatus is configured in such a way that an abutment height of the stop elements can be set, by means of setting elements connected to the free ends of the stop elements, over a range of one millimeter or less to about 10 to 20% of a distance of the vane root from the vane head of the vane or of the height of the vane.

Both the stop elements and the setting elements and also the abutment elements should be provided in such a way that the press block can be stopped reliably when the abutment elements butt against the stop elements.

The press block can in this case be predetermined on a pressure plate which is connected to a piston rod of the press cylinder. The pressure plate, which can be put under pressure by the press cylinder, then presses, via a pressure surface, preferably running essentially parallel to the pressure plate, of a press block, a vane which is fixed to the base element. In this case, the press block is preferably manufactured from a material which is softer than the material of the cover plate, preferably from aluminum, and a press block has on the pressure surface a preferably centrally arranged bulge.

The method according to the invention and the apparatus according to the invention can be used for the forming, refurbishment or reconditioning of a cover plate of a turbine vane, in particular of a guide vane of a turbomachine.

DETAILED DESCRIPTION

Preferred embodiments, then, are explained by means of FIGS. 1 to 8, essentially identical elements being designated by the same reference symbols.

Figure 1:
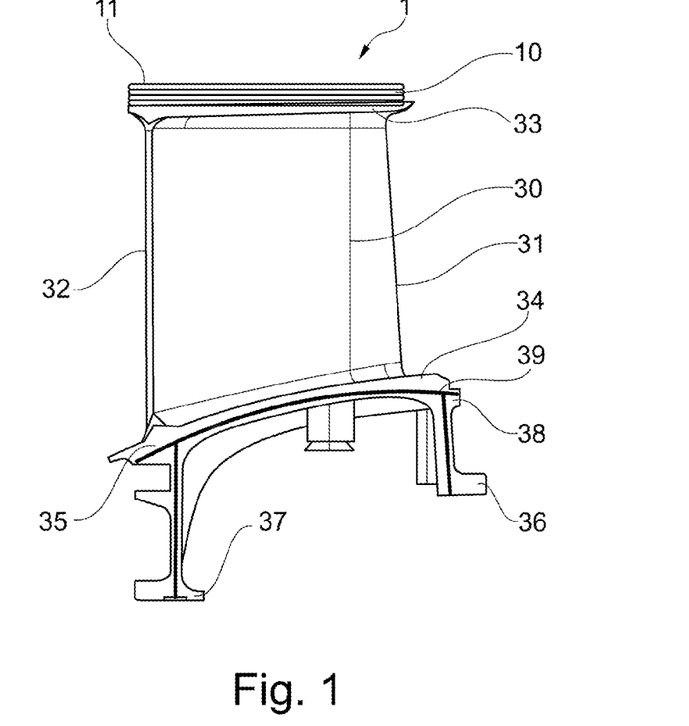
FIG. 1 shows a side view of a guide vane of a gas turbine.
Figure 6:
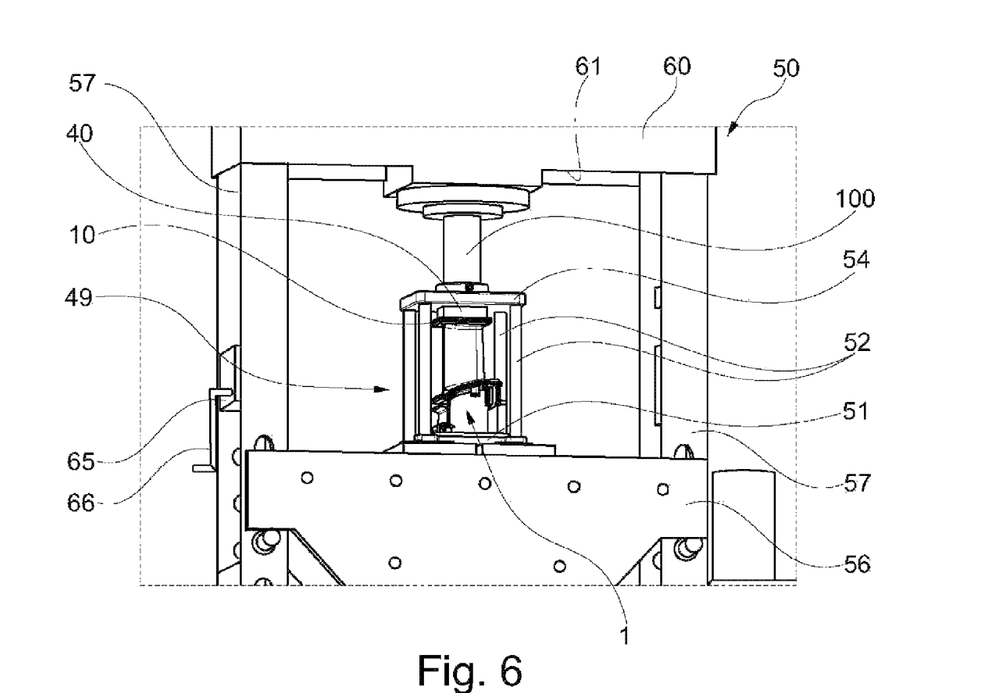
FIG. 6 shows an extended detail of the forming apparatus according to the invention, as shown in FIG. 5.
Figure 7:
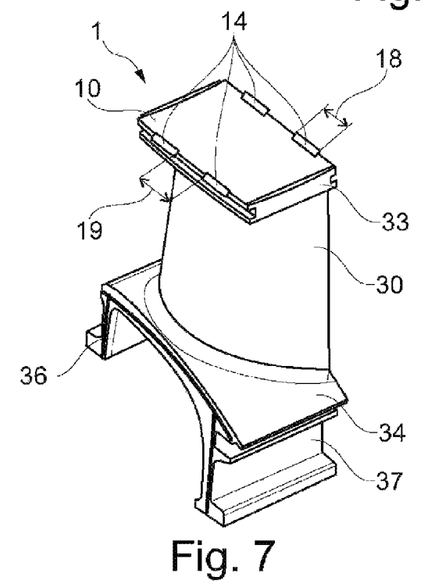
FIG. 7 shows a further perspective view of the vane according to FIG. 1.

FIG. 1 depicts an exemplary guide vane 1 from the prior art in a side view. An airfoil 30 of preferably a profiled form ascends from a base plate of the vane root 34 upward in FIG. 1 (that is to say, essentially perpendicularly to the flow direction of a working fluid) and has connected to it at the distal end a vane head 33. At the proximal end of the vane 1, that is to say at the vane root 34, fastening elements 36, 37 projecting downward, that is to say opposite to the direction from the vane root 34 to the vane head 33, are provided for fastening the vane 1 in the turbine. The vane head 33 is essentially a free end of the vane 1. A shroud or cover plate 10, as is known from the prior art and is preferably of rectangular configuration, as can be seen, for example, in FIG. 7, is provided on the vane head 33. As is clear in FIG. 1, the cover plate 10 runs with its longitudinal side essentially perpendicular to the longitudinal direction of the airfoil 30, that is to say essentially parallel to the flow direction. In this case, the cover plate 10 is fastened with its bottom face 12 (see also FIG. 6) to the vane head 33 and provides a top face 11 lying opposite the bottom face 12 and located on the outside with respect to the vane 1. The middle region of the cover plate 10 is in this case hollowed underneath (see the cavity 15 in FIG. 8). A covering layer may additionally be attached to the outer face 11, for example a metallic honeycomb structure with a thickness or depth of one millimeter to one or two centimeters, having cells or cavities extending perpendicularly from the cover plate 10 and preferably open on the outside with respect to the vane 1. This covering layer may serve for protecting the cover plate 10 and/or for better sealing.

Figure 8:
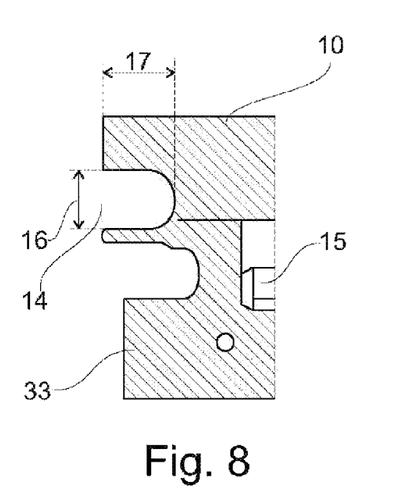
FIG. 8 shows a cross section through an upper part of a vane according to FIG. 1.

The airfoil 30 extending transversely to the flow direction with a pressure side and a suction side between a leading edge 31 and a trailing edge 32 has inside it cooling ducts and cooling spaces, while, in particular, the vane head 33 may also be configured so as to be partially hollow, that is to say to have cavities 15 (see FIG. 8).

The vanes 1 (here, guide vanes) arranged in rings in operation-ready turbomachines form, preferably by the contacting of directly adjacently arranged vane roots 34 or cover plates 10, a ring shaped outer or inner (with respect to the rotor axis) boundary of a flow duct in which the working fluid flows in the flow direction past the airfoils 30 (from right to left in FIG. 1). In preferred regions of the boundary and/or airfoil 30, holes or hole rows are arranged, through which a cooling medium can flow into the flow duct and there form a protective cooling film.

In order to seal off mutually contacting vane roots 34 of adjacent vanes 1, a sealing element 39, for example strip seals, may engage sealingly, between mutually opposite side faces 38 of the respective vane roots 34, in sealing grooves lying opposite one another on adjacent side faces 38.

The cover plate 10 or, if appropriate, the abovementioned covering layer, which covers the surface generally partially, preferably over the entire area, is now deformed during the operation of the turbomachine on account of thermal and mechanical load and, in particular, is bulged outward (that is to say, upwardly in FIG. 1) with respect to the vane 1. As a result of this bulging occurring particularly in the under hollowed middle regions of the cover plate 10 and, if appropriate, also of the covering layer, to a greater extent than in its marginal regions, grinding contact may take place between parts of the cover plate 10 or of the covering layer and the opposite and relatively moving element, while frictional and/or sealing losses and/or the stripping of material from the affected elements moving in relation to one another may occur.

Figure 2:
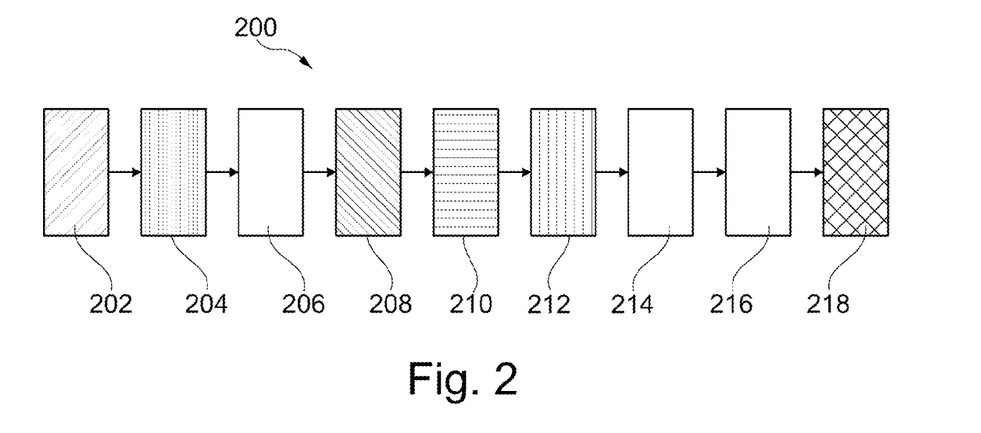
FIG. 2 shows a block diagram of a preferred embodiment of the method according to the invention.

FIG. 2 illustrates a block diagram 200 of a preferred embodiment of a method according to the invention for the forming and/or reconditioning or treatment or refurbishment of the cover plate 10 deformed correspondingly, for example, on account of the above explained use or for other reasons, some method steps being of an optional nature.

In a first step, an analysis step 202, the dimension analysis of the vane 1 demounted from the turbine and possibly deformed is carried out. This analysis can be conducted by means of known measuring instruments and, in particular, should indicate whether deformation, that is to say bulging, of the cover plate 10 is present, and, if so, whether the respective deformation of the cover plate 10 allows forming by means of the method according to the invention. If, for example, a bulge height over the optimal profile of the surface 11 amounts to more than 0.1 millimeter, forming can be carried out.

A zero position, that is to say the position of the highest elevation of the cover plate 10 in the middle region with respect to one or more reference points should be determined. Such a reference point is in this case preferably a location on the vane 1 which does not undergo deformation as a result of the intended use, that is to say, for example, a point on the vane root 34 or fastening elements 36, 37. It should therefore be determined whether forming of the cover plate 10 is necessary for the intended use of the vane 1, and if so whether the height of the bulge in the middle region of the cover plate 10 above the original dimension is sufficiently large for the successful employment of the method. Such a bulge height, can amount, for example, to about 0.1 millimeter to about 1 millimeter or more, in particular to about 0.5 millimeter, but in the individual case depends on a shape and configuration of the vane 1. The zero position is advantageously logged.

In a step which follows the analysis step 202 and which is advantageous if the cover plate 10 carries a covering layer, particularly if this covering layer is partially worn and has to be replaced, the covering layer is stripped off in a rough stripping step 204. In this case, care must be taken to ensure that the cover plate 10 is not damaged and no stripping of basic material (stripping of cover plate material) takes place.

If this covering layer, is, for example, a metallic honeycomb layer soldered onto the cover plate 10 and having honeycombs which are soldered to an underside on the surface 11 of the cover plate 10 and extend from the cover plate 10, this honeycomb layer can be roughly removed, for example, by means of a pneumatic hammer and/or by grinding or other means known to a person skilled in the art, care being taken to ensure that neither material of the cover plate 10 is stripped off nor the cover plate 10 is damaged. By means of such a pneumatic hammer, in particular, remains of solder cannot be removed, but these remains of only minimal height can remain and are removed in a subsequent step.

To carry out the rough stripping step 204, the vane can be fixed by known clamping devices or screwing devices in a position favorable for this work. After this step, therefore, some remains of the covering layer (inter alia, remains of solder from the soldering of the covering layer removed with the exception of a few remains) may still be present on the surface 11 of the covering layer 10. These remains preferably project less than 0.05 millimeter, in particular less than 0.01 millimeter above the cover plate 10, in particular these remains on the surface 11 should not deform the cover plate 10 in an unwanted way during forming, that is to say should not cause any undesirable local deformations in the cover plate material.

After these preparatory steps and after a calibration step 206 which is described further below, the cover plate 10 can then be formed by pressing. Since the cover plate 10 is then pressed in a sheet like manner, it is important that it is essentially smooth, that is to say has at most still the abovementioned remains in the pressing region. In this case, essentially, the bulge of the cover plate 10 is to be corrected, that is to say forming is to be carried out in the radial direction (with respect to the turbine).

In a following forming step 208, the cover plate 10, together with the abovementioned remains, is pressed in the radial direction, that is to say against the vane root 34, by means of a pressing apparatus or forming apparatus 50 in which the vane 1 is chucked. In this case, it is advantageous if a press cylinder 100 presses onto the cover plate 10 via a pressure plate 54 having a pressure surface 41 of a press block 40, the press block 40 being composed of a material (for example, aluminum) which is softer than the material of the cover plate 10. Furthermore, it is advantageous if the cover plate material is in turn softer than the basic material of the vane 1. These gradations in material hardness prevent the vane 1 from being damaged during pressing.

Moreover, it is advantageous if the press block 40 is shaped in such a way that, during pressing, an indentation is pressed into the cover plate 10. Reference may be made in this regard to FIG. 3. Care must be taken to ensure that, during pressing, particularly in the region of the indentation, not so much pressure is transmitted to the airfoil 30 that the latter is appreciably deformed. It is therefore advantageous, in particular, to indent a middle region, preferably under hollowed, for example, with cooling cavities 15 (see FIG. 8), of the cover plate 10 with a greater depth and to reduce the indentation depth toward the cover plate margins. For this purpose, the pressure surface 41, 42 of the press block 40 may be curved at least partially convexly outward, preferably be shaped with a maximum elevation in a region contacting the middle region of the cover plate 10, so that the pressure surface 41, 42 of the press block 40 which makes contact with the cover plate 10 is curved outwardly. A bulge 42 is therefore provided on the pressure surface 41. The indentation, formed by pressing force by means of the press block 40, in the cover plate 10 may have a depth with respect to the cover plate margins or the bulge 42 of the press block 40 may have a height with respect to the marginal regions of the pressure surface 41 which run essentially parallel to the pressure plate 54. The pressure surface 41 may also be designed as a spherical surface without flat portions.

Figure 3:
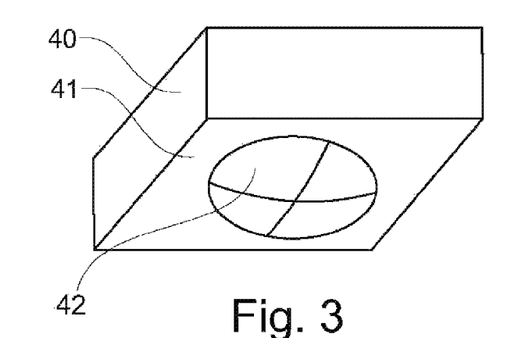
FIG. 3 shows an embodiment of a press block of the forming apparatus according to the invention.
Figure 4:
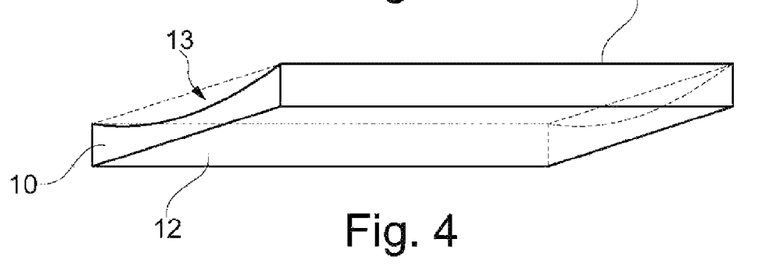
FIG. 4 shows a formed cover plate, provided with a concavity, of the guide vane according to FIG. 1.

It is advantageous to introduce the abovementioned indentation into the cover plate 10 since the cover plate 10 may, as intended, project toward the cylindrical rotor of the turbomachine, for example the gas turbine shaft, and, for the optimum adaptation of the vane 1, a concavity 13 running along a rotor axis of the rotor may be provided in the cover plate 10, the rotor engaging at least partially into the concavity 13. In other words, the surface 11 of the cover plate 10 is then optimally shaped so as to be curved inwardly toward the bottom face 12 of the cover plate 10, that is to say concavely. The cover plate 10 therefore preferably has a recess, in the form of a segment of a circle and running in the flow direction, in the form of a concavity 13, a radius assigned to the segment of a circle corresponding preferably to a radius of the rotor or of the turbine shaft. With an indentation being pressed in, an approach to this target shape is already achieved, and subsequent accurate grinding of the exact concavity 13 results in less material being stripped off than if the surface 11 were flat or even bulged before grinding and the entire concavity 13 had to be ground out. Since the vane materials are in widespread use in turbine construction, a pressure of the press block 40 composed of aluminum onto the cover plate 10 and up to about 8 bar is provided.

After the forming step 208, a further analysis step 202 may preferably be carried out, in order to establish the effect of the forming step 208 on the abovementioned zero position with respect to the reference points.

In a following grinding step 210, the abovementioned concavity 13 which in the installed state runs in the flow direction is ground into the cover plate 10 as a concave recess preferably in the form of a segment of a circle. The depth of the concavity 13 is, for example, 0.5 mm to 1 mm. The cover plate 10 with the concavity 13 is illustrated diagrammatically in FIG. 4. In this grinding operation, preferably using CNC technology, any of the abovementioned remains of the covering layer which are present on the surface 11 and also other defects or unevenesses are eliminated partially from the surface 11 in a grinding region. For this reason, therefore, in the rough stripping step 204, only material elevations on the cover plate 10 which adversely influence the forming step 208, that is to say, for example, a defective covering layer, should be removed.

After the grinding step 210, remains located on the surface 11 can preferably be removed carefully by hand, and with a minimal amount of basic material stripped off, in a (basically optional) fine stripping step 212. Moreover, in this process, any defects and unevenesses present, for example damage, on the surface 11 of the cover plate 10 are eliminated. The covering layer is consequently removed completely from the cover plate 10, and the vane 1 carries a cover plate 10 which is formed, as desired or as intended, and is provided, if appropriate, with a concavity 13 and which has been thinned only minimally or not at all as a result of the abovementioned method steps.

Preferably, further, in a welding preparation step 214 the contact regions, located laterally with respect to the vane 1, between the vane head 33 and the cover plate 10 are then machined. Reference will be made in this regard to FIGS. 7 and 8. In this case, as a preparatory measure, a plurality of, preferably four welding recesses 14 projecting laterally into the vane 1 and running essentially parallel to the cover plate 10 are prepared in the contact region between the cover plate 10 and vane head 33 and cut out both parts of the cover plate 10 and parts of the vane head 33. These welding recesses 14 have a height 16, a depth 17 and a length 18, preferably in each case two welding recesses being formed along a longitudinal side of the cover plate 10, preferably symmetrically with respect to a mid point of the longitudinal side. Moreover, it is advantageous if in each case two welding recesses 14 lie directly opposite one another over the cover plate 10, as illustrated in FIG. 7. The length 18 of the welding recess 14 preferably amounts to about 15 mm to about 25 mm, in particular to about 20 mm. The depth of the welding recess 14 preferably amounts to about 4 mm, and the height of the welding recess to about 3 mm. Depending on the vane type, a distance 19 between two welding recesses along the longitudinal side of the cover plate 10 may amount to about 15 mm up to 20 millimeters. In this case, care must be taken to ensure that the surface of the welding recess 14 is free of solder, so that the weld holds optimally.

In a welding step 216 following the welding preparation step 214, the cover plate 10 and the vane head 33 are welded together in the welding recesses 14, the welding recesses 14 then visibly being filled with welding material by the welding together. When the weld seams or the preferably four welding slots are dressed, care must then be taken to ensure that no basic material of the vane 1 is stripped off.

Figure 5:
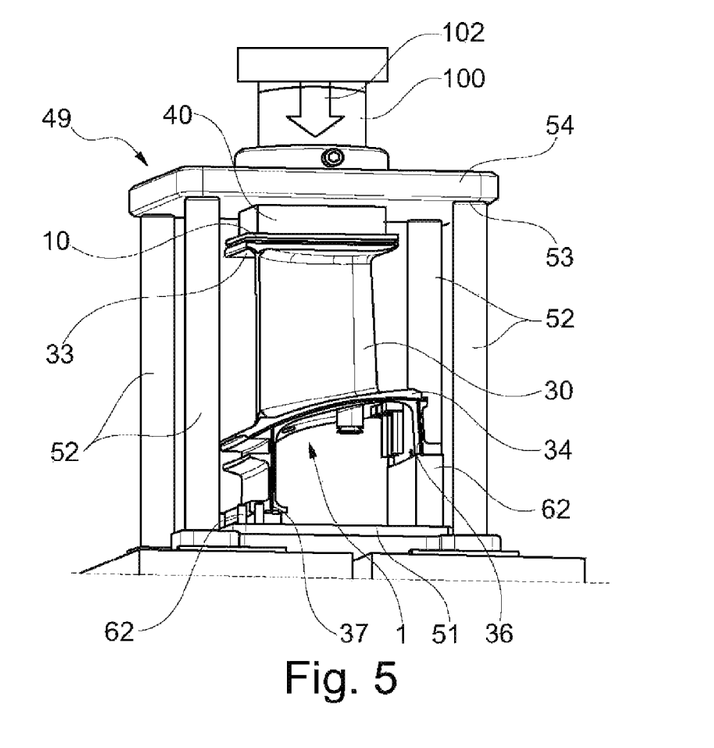
FIG. 5 shows a detail of a forming apparatus according to the invention in which a guide vane according to FIG. 1 is chucked, in a perspective view.

In a further optional mounting step 218, a covering layer may be applied to the surface 11 of the cover plate 10 which is formed, as desired, and is provided, if appropriate, with a concavity 13. For this purpose, for example, a metallic honeycomb layer may be soldered on. In this case, the surface of the covering layer should essentially copy the concave shape, predetermined by the concavity 13, of the surface 11 of the cover plate 10, so that, instead of the cover plate 10, the covering layer is arranged around the rotor or turbine shaft, as mentioned above, or the rotor or turbine shaft engages into the covering layer, as described above with regard to the cover plate 10. A preferred embodiment of the forming apparatus 50 according to the invention is illustrated in FIG. 5 and FIG. 6. In this case, the forming apparatus 50 comprises a carrier frame with a base element 56, with supporting side elements 57 and with a connection element 60 connecting the side elements 57. The frame is suitable in dimensional terms for receiving on an underside 61 of the connection element 60 a press cylinder 100 extendable downward, that is to say in the pressing direction 102 (see FIG. 5). Furthermore, the side elements 57, which are connected laterally to the base element 56 are spaced apart such that, and the connection element 60 is attached to the side elements 57 at a height such that, a pressure cell 49, which can receive the vane 1 to be formed (or else a specimen part described below) in a pressure cell interior, can be arranged preferably approximately centrally on the base element 56 and below the press cylinder 100 in the pressing direction.

Connected to the preferably hydraulically or pneumatically moved press cylinder 100 is an essentially horizontally provided and essentially square pressure plate 54 which in terms of area essentially covers the pressure cell 49, as seen in a top view from above. The pressure cell 49 further comprises a base plate 51 which is arranged parallel below and spaced apart from the pressure plate 54. Between the base plate 51 and the pressure plate 54 lies the pressure cell interior. Four stop columns or stop elements 52 which delimit the pressure cell 49 laterally extend essentially vertically upward from corner regions of the base plate 51 or from the base element 56. When the pressure plate 54 is moved downward in the pressure direction 102 by means of the press cylinder 100, it comes into abutment on the stop columns 52 likewise in corner regions, in the case of a predefined stroke length of the cylinder 100. The corner regions of the pressure plate 54 are as it were the abutment elements of the stop elements 52. A volume, the pressure cell interior, located between the stop elements 52 and between the pressure plate 54 and the base plate 51 is suitably dimensioned for receiving a vane 1 or a specimen part of a vane 1. In this case, the vane 1 can, for example, be led through between the stop columns 52. Fasteners for fixing the vane 1, for example via fasteners 36, 37, are provided on the base plate 51, for example by clamping or screwing, the vane 1 being releasably fixable in a predetermined position. This position is such that the cover plate 10 of the vane 1 comes to lie symmetrically and in a sheet like manner opposite the pressure plate 54 and in a predefined height region. The pressure plate 54 carries centrally, that is to say between its corner regions, a press block 40. This preferably exchangeably configured press block 40 is preferably the sole element which comes into pressing contact with the cover plate 10 during the forming step 208 and which is connected directly to the cylinder 100 and has the properties mentioned above with regard to the press block 40, that is to say, in particular, is manufactured from aluminum, has a pressure surface 41 which is arranged preferably parallel to the pressure plate 54, and on this pressure surface 41 has, if appropriate, a bulge 42 which presses flat a deformed cover plate 10 or, if appropriate, also indents it. As described above, the pressure surface 41 may therefore also have a bulge 42 which indents in a predefined manner an under hollowed middle region of the cover plate 10 during the forming step 208, as described above.

The stop elements 52 may have setting elements 53 at their free ends. These setting elements 53 are, for example, known setscrews or clamping elements or other suitable means with bearing elements for the pressure plate 54, so that a length of each stop element 52 can be set individually over the abovementioned height region into which the cover plate 10 comes to lie, with the result that an abutment height of the pressure plate 54 or pressure surface 41, 42 or, in other words, a distance between the base plate 51 and pressure plate 54 or pressure surface 41, 42 can be adjusted. The set length of the setting elements therefore preferably at least partially spans the abovementioned height region in which the cover plate 10 mounted in the pressure cell 49 comes to lie. A calibration step 206 described below can consequently be carried out.

The individual elements of the forming apparatus 50 are coordinated in terms of material and of dimension with the prevailing forces during the intended use in a way known to a person skilled in the art.

When a forming apparatus 50 according to the invention is used, it is advantageous to extend the method according to the invention with a calibration step 206. In this step 206, the press block 40 preferably composed of aluminum is fixed on the press cylinder 100, for example firmly screwed or firmly clamped. A specimen part, which simulates relevant portions of an optimally shaped vane 1 with a non bulged cover plate 10, that is to say with a specimen surface shaped, as desired, and corresponding to the surface 11 of the cover plate 10, is then chucked into the forming apparatus. The press cylinder 100 is then moved toward this specimen surface until the press block 40 mounted on the press cylinder 100 via the pressure plate 54 directly touches the specimen surface in a target position (which may correspond here to the abovementioned zero position), but without deforming or damaging the specimen surface.

The stop elements 52 are subsequently moved by means of the setting elements 53 into contact against the abutment elements 54, that is to say the corner regions of the pressure plate 54, without the press block 40 being moved, and the setting elements 53 are fixed, as intended, such that, when the press cylinder 100 is extended once again, after its retraction, said setting elements make the press block 40 extendable via the abutment elements 54 in a defined manner only as far as the abovementioned target position. The abovementioned setting elements 53 are therefore used in order to adapt the stop columns or stop elements 52 in length in such a way that pressing of the specimen surface is just not possible, but instead only contact. The forming apparatus 50 is consequently calibrated and the subsequent extension of the press block 40 toward the deformed turbine vane 1, braced in a predefined manner and to be formed, as far as its target position ensures the forming of the bulged cover plate 10 in a radial direction, so that the lowest point of the indentation generated as a result of the pressing operation is, because of the action of the pressure surface 41, 42 of the press block 40, at the same height with respect to the corresponding reference point as the above described contact point between the specimen surface and press block 40 (target position).

The press cylinder 100 can be actuated by hand, that is to say, for example, by means of an actuating element 65 with a crank handle 66. Alternatively, otherwise conventional actuating devices, for example electronic and/or computer controlled actuating elements, may also be present.

In other embodiments not illustrated in the figures, only one, two, three or more than four stop elements 52 may be provided, preferably at least one of these being designed to be settable, as described above. The stop elements 52 may also be provided so as to be fixed and the mounted vane so as to be vertically adjustable. The base plate 51 and/or the pressure plate 54 and therefore the pressure cell 49 may be essentially square, as seen from above, as illustrated in the figures, or else may have any other shape. It is simply important in this case that the vane 1 or the specimen part can be introduced into the pressure cell 49 and fixed in a simple way.

The stop elements 52 may be shaped in another way known to a person skilled in the art.

It is understood, therefore, that this invention is not limited to the particular embodiments disclosed, but is intended to cover all modifications which are within the spirit and scope of the invention as defined by the appended claims; the above description; and/or shown in the attached drawings.

| LIST OF REFERENCE SYMBOLS | |
|---|---|
| 1 | Vane |
| 10 | Cover plate |
| 11 | Surface of the shroud |
| 12 | Bottom face of the shroud |
| 13 | Concavity |
| 14 | Welding recess |
| 15 | Cavity |
| 16 | Height of the recess 14 |
| 17 | Depth of the recess 14 |
| 18 | Length of the recess 14 |
| 19 | Distance between recesses 14 |
| 30 | Airfoil |
| 31 | Leading edge |
| 32 | Trailing edge |
| 33 | Vane head |
| 34 | Vane root |

-continued

| LIST OF REFERENCE SYMBOLS | |
|---|---|
| 35 | Mounting portion |
| 36, 37 | Fastening element |
| 38 | Side face |
| 39 | Sealing element |
| 40 | Press block |
| 41 | Pressure surface |
| 42 | Bulge |
| 49 | Pressure cell |
| 50 | Forming apparatus |
| 51 | Base plate |
| 52 | Stop elements |
| 53 | Setting elements |
| 54 | Pressure plate |
| 56 | Base element |
| 57 | Side element |
| 60 | Connection element |
| 61 | Underside of the connection element |
| 65 | Actuator |
| 66 | Crank handle |
| 100 | Press cylinder |
| 102 | Pressure direction |
| 200 | Block diagram |
| 202 | Analysis step |
| 204 | Rough stripping step |
| 206 | Calibration step |
| 208 | Forming step |
| 210 | Grinding step |
| 212 | Fine stripping step |
| 214 | Welding preparation step |
| 216 | Welding step |
| 218 | Mounting step |

What is claimed is:

1. A method for reconditioning a cover plate of a vane of a turbomachine, by a forming apparatus, the vane comprising a mounting portion with fastening elements being connected, from a vane root of the vane, radially outward with respect to a rotor axis of the turbomachine, and an airfoil being connected in an opposite direction, a vane head being connected to the airfoil and a cover plate being connected to the vane head, the cover plate being bulged in the direction opposite to the vane root, the method comprising:

determining, in an analysis step, dimensions of the vane in relation to the cover plate with respect to predefined reference points of the vane by dimension analysis;

comparing the measurement values from the analysis step with reference values;

forming, the bulged cover plate at least essentially pressed smooth, by pressing by the forming apparatus in a forming step; and re-treating after the forming step, the cover plate in one or more follow up steps;

wherein after the forming step a grinding step is carried out, which involves at least the smooth grinding of an outer surface of the cover plate with respect to the vane, with a minimal stripping of basic material from the cover plate, the analysis step being carried out once again after the forming step and before the grinding step, in order to determine the effect of the forming step and of the grinding step;

wherein the grinding step comprises a grinding of a concavity into the cover plate, the concavity being adapted correspondingly, in the mounted state, to an element, which is arranged opposite the cover plate mounted in the operationally ready turbomachine and which moves in relation to the cover plate, in such a way that the concavity can partially receive said element.

2. The method as claimed in claim 1, wherein before the forming step, a worn covering layer, present on the surface of the cover plate, is essentially removed in a rough stripping step, without material of the cover plate being stripped off.

3. The method as claimed in claim 2, wherein after the grinding step, in a fine stripping step any remains of the possible covering layer are removed from the cover plate.

4. The method as claimed in claim 3, wherein, after the grinding step, and, after the fine stripping step, in a welding preparation step at least one welding recess running essentially laterally along and parallel to the cover plate is introduced in a lateral contact region between the cover plate and the vane head, the welding recess cutting out parts of the cover plate and parts of the vane head.

5. The method as claimed in claim 4, wherein in a welding step, the cover plate and the vane head are welded together in the welding recesses so as to fill the welding recesses with welding material from the inside outward.

6. The method as claimed in claim 1, wherein, in the forming step, a press block contacting the cover plate with a pressure surface is used for forming, the press block being made from a softer material than the cover plate, said press block having on its pressure surface an outwardly directed bulge, by means of which an indentation is pressed into a middle region of the cover plate.

7. The method as claimed in claim 3, wherein in a mounting step, a new covering layer, in the form of a metallic honeycomb layer with honeycombs extending away from the cover plate, is applied to the cover plate, an outer surface of said new covering layer running essentially parallel to the surface of the cover plate.

8. A method for reconditioning a cover plate of a vane of a turbomachine, by a forming apparatus, the vane comprising a mounting portion with fastening elements being connected, from a vane root of the vane, radially outward with respect to a rotor axis of the turbomachine, and an airfoil being connected in an opposite direction, a vane head being connected to the airfoil and a cover plate being connected to the vane head, the cover plate being bulged in the direction opposite to the vane root, the method comprising:
- determining, in an analysis step, dimensions of the vane in relation to the cover plate with respect to predefined reference points of the vane by dimension analysis;
- comparing the measurement values from the analysis step with reference values;
- forming, the bulged cover plate at least essentially pressed smooth, by pressing by the forming apparatus in a forming step; and
- re-treating, after the forming step, the cover plate in one or more follow up steps;
- wherein the forming apparatus is calibrated in a calibration step, said calibration step comprising the insertion of a specimen part, which simulates relevant portions of an optimally shaped vane with a non bulged cover plate and corresponding to the surface of the cover plate, into the forming apparatus, the forming apparatus further comprising a press cylinder which is movable toward said specimen surface until a press block mounted on the press cylinder directly touches the specimen surface in a target position, without the specimen surface being deformed or damaged, and subsequently, before the calibration step, stop elements which do not directly contact the press block being guided, by setting elements of the forming apparatus which are attached to the stop elements, into contact against abutment elements connected firmly to the press block, without the press block being moved, and the setting elements then being fixed, as intended, such that, when the press cylinder is extended once again, after its retraction, the stop elements, via the setting elements, make the press block extendable via the abutment elements in a defined manner only as far as the abovementioned target position.

9. An apparatus, for the forming of a cover plate of a turbine vane of a turbomachine having a mounting portion with fastening elements being connected, from a vane root of the vane, radially outward with respect to a rotor axis of the turbomachine, and an airfoil being connected in the opposite direction, a vane head being connected to the airfoil and a cover plate being connected to the vane head, the cover plate being bulged in the direction opposite to the vane root, the apparatus comprising:
- a carrier frame with side elements arranged so as to be spaced apart and with a base element and a connection element which extend in each case between the side elements; a pressure plate movable by a press cylinder attached to the connection element and a pressure cell, delimited by a base plate, for the vane, which is fixable in the pressure cell by fastening elements between stop elements extending laterally with respect to the vane from the base plate to the pressure plate toward free ends and laterally delimiting the pressure cell, and the pressure cell being closable by the pressure plate being pressed by the press cylinder onto the vane and against the stop elements configured so as to stop the pressure plate.

10. The apparatus as claimed in claim 9, wherein an abutment height of the stop elements can be set, by setting elements connected to the free ends of the stop elements, over a range of one millimeter up to 20% of a distance between the vane root and the vane head of the vane.

11. The apparatus as claimed in claim 9, wherein the pressure plate, which can be put under pressure by the press cylinder contacts by pressing, via a pressure surface, running essentially parallel to the pressure plate, of a press block, a vane which is fixed to the base element, the press block being manufactured from a material which is softer than a material from which the cover plate is comprised, and wherein the press block has on the pressure surface a centrally arranged bulge.

12. The apparatus as claimed in claim 9, wherein the apparatus is configured to carry out a method for reconditioning the cover plate of the vane of the turbomachine, the method comprising:
- determining, in an analysis step, dimensions of the vane in relation to the cover plate with respect to predefined reference points of the vane by means of dimension analysis;
- comparing the measurement values from the analysis step with reference values;
- forming, the bulged cover plate at least essentially pressed smooth, by pressing by the forming apparatus in a forming step; and
- re-treating, after the forming step, the cover plate in one or more follow up steps.

13. A method for forming a cover plate of a vane of a turbomachine, by means of a forming apparatus comprising a mounting portion with fastening elements being connected, from a vane root of the vane, radially outward with respect to a rotor axis of the turbomachine, and an airfoil being connected in the opposite direction, a vane head being connected to the airfoil and a cover plate being connected to the vane head, the cover plate being bulged in the direction opposite to the vane root, the method comprising:
- determining, in an analysis step, dimensions of the vane in relation to the cover plate with respect to predefined reference points of the vane by dimension analysis;

comparing the measurement values from the analysis step with reference values;
forming, the bulged cover plate at least essentially pressed smooth, by pressing by the forming apparatus in a forming step; and
re-treating after the forming step, the cover plate in one or more follow up steps, wherein the method is carried out by the use of an the apparatus comprising:
a carrier frame with side elements arranged so as to be spaced apart and with a base element and a connection element which extend in each case between the side elements; a pressure plate movable by a press cylinder attached to the connection element and a pressure cell, delimited by a base plate, for the vane, which is fixable in the pressure cell by fastening elements between stop elements extending laterally with respect to the vane from the base plate to the pressure plate toward free ends and laterally delimiting the pressure cell, and the pressure cell being closable by the pressure plate being pressed by the press cylinder onto the vane and against the stop elements configured so as to stop the pressure plate.

* * * * *